US006812830B2

(12) United States Patent
Faye

(10) Patent No.: US 6,812,830 B2
(45) Date of Patent: Nov. 2, 2004

(54) EMERGENCY OPERATING DEVICE FOR AN INTERIOR COMPARTMENT OF A VEHICLE

(75) Inventor: Ian Faye, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 10/056,315

(22) Filed: Jan. 24, 2002

(65) Prior Publication Data

US 2002/0109588 A1 Aug. 15, 2002

(30) Foreign Application Priority Data

Jan. 31, 2001 (DE) ........................................ 101 04 053

(51) Int. Cl.[7] ................................................ B60R 25/10

(52) U.S. Cl. ............................. 340/426.29; 340/573.1; 340/573.4

(58) Field of Search ......................... 340/425.5, 426.29, 340/573.1, 573.4, 573.7, 438, 562; 296/76; 361/172

(56) References Cited

U.S. PATENT DOCUMENTS

| | | | | |
|---|---|---|---|---|
| 4,486,806 A | * | 12/1984 | Mochida et al. | 361/172 |
| 6,018,292 A | | 1/2000 | Penny, Jr. | 340/426.29 |
| 6,335,687 B1 | * | 1/2002 | Terashima et al. | 340/573.1 |
| 6,339,376 B1 | * | 1/2002 | Okada | 340/562 |
| 6,480,103 B1 | * | 11/2002 | McCarthy et al. | 340/573.4 |

FOREIGN PATENT DOCUMENTS

| | | |
|---|---|---|
| EP | 0 475 356 A1 | 3/1992 |

* cited by examiner

*Primary Examiner*—Van T. Trieu
(74) *Attorney, Agent, or Firm*—Michael J. Striker

(57) ABSTRACT

The emergency operating device for releasing a trunk lock mechanism of a motor vehicle, in which a human, especially a small child, or an animal could be locked, includes a sensor device in the trunk and an evaluation device connected to the sensor device. The sensor device generates and transmits sensor signals that indicate whether or not the human or animal is present in the trunk. The evaluation device receives and evaluates or analyzes the sensor signals to ascertain whether or not the human or animal is present in the trunk. The evaluation device generates an operating signal for automatic activation of the release mechanism if the human or animal is present in the trunk.

16 Claims, 1 Drawing Sheet

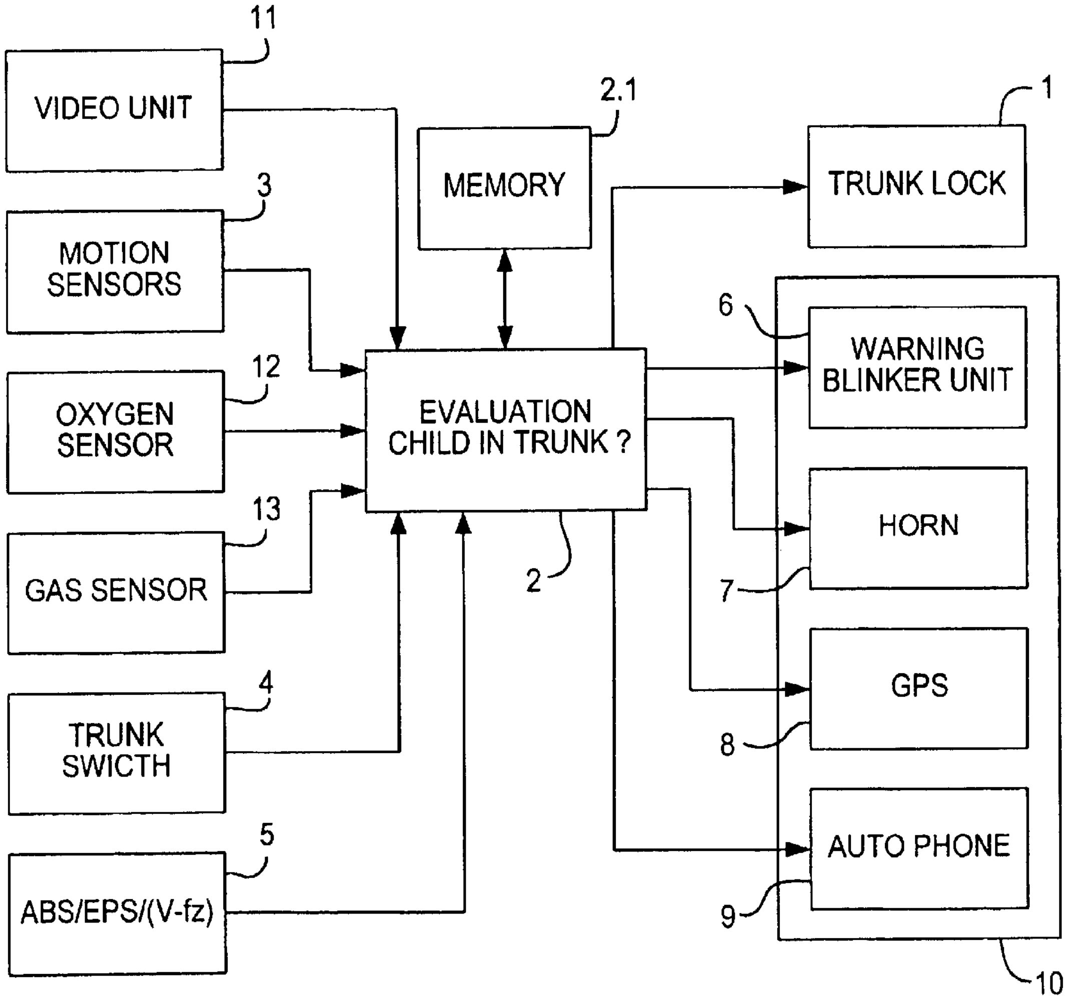
11
VIDEO UNIT
2.1
MEMORY
1
TRUNK LOCK
3
MOTION SENSORS
6
WARNING BLINKER UNIT
12
OXYGEN SENSOR
EVALUATION CHILD IN TRUNK ?
13
GAS SENSOR
2
HORN
7
GPS
4
TRUNK SWICTH
8
5
AUTO PHONE
ABS/EPS/(V-fz)
9
10

EMERGENCY OPERATING DEVICE FOR AN INTERIOR COMPARTMENT OF A VEHICLE

BACKGROUND OF THE INVENTION

1. Field of the Invention

The present invention relates to an emergency operating device for a release mechanism that opens a lock mechanism of an interior compartment of a vehicle, especially the trunk of a motor vehicle, in which a living being—human or animal—could be locked.

2. Description of the Related Art

An emergency operating device of this type is described in U.S. Pat. No. 6,018,292. This emergency operating device includes an advantageously illuminated operating button provided with information and arranged in the trunk of a vehicle. This operating button is connected in parallel in the usual manner with a trunk unlocking device present in the vehicle. Activation of a manual switch in the driver's compartment of the vehicle blocks the functioning of this operating button located in the trunk, for example, in order to avoid unintended operation of the button by an object in the trunk. However a small child or a dog, who is not able to release the lock by means of the operating button or to activate an alarm, could be locked in the trunk.

A central locking device for opening the door of a motor vehicle is described in EP 0 475 356 B1. The central locking device can release a lock mechanism for the vehicle door when a person is in the vehicle passenger compartment, even when a hand-held transmitter sends out a locking signal to a receiver in the compartment. A monitoring device detects the presence of a person in the interior compartment by means of a monitoring device. If the presence of a person is detected, the bolt of the door lock remains released so that a locked door can be opened by the operating elements present in the interior compartment. Turning on the ignition activates the interior monitoring device.

SUMMARY OF THE INVENTION

It is an object of the present invention to provide an emergency operating device of the above-described kind, which provides increased safety with more functions.

This object and others, which will become more apparent hereinafter, are attained in an emergency operating device for a release mechanism that opens a lock of an interior compartment of a vehicle, especially the trunk of a motor vehicle, in which a living being—human or animal—could be locked.

According to the invention the emergency operating device comprises

- sensor means arranged in the interior compartment, the sensor means comprising means for monitoring the interior compartment to detect the presence of the living being in the interior compartment and means for generating and transmitting sensor signals that differ according to whether or not the living being is present in the compartment; and
- evaluation means for receiving and analyzing the sensor signals from the sensor means, the evaluation means including means for ascertaining whether or not the living being is present in the interior compartment from the sensor signals and for generating an operating signal for automatic activation of the release mechanism if the living being is present in the interior compartment.

Without knowing in advance of a person or animal locked in the interior compartment the evaluation means automatically responds to the sensor means by releasing the lock mechanism when the person or animal is detected. Thus the danger that a person, especially a child, could be locked in the interior compartment is eliminated, without requiring operation of operator elements by that person.

According to an advantageous preferred embodiment of the emergency operating device according to the invention a travel sensor is provided in the device, which transmits a signal to the evaluation device that indicates whether the vehicle is in motion or stopped. The evaluation means blocks the operation of the release mechanism during travel of the vehicle. In this way the danger of exposure of a locked-in person e.g. to vehicle exhaust gas can be avoided without additional effort and the person can be freed from a dangerous situation, even when the vehicle is stationary but the motor is running or the ignition turned on. On the other hand, during travel a person in the passenger compartment is safe and the person can be safely released at the next opportunity. Since the release mechanism is blocked during travel of the vehicle, the danger of unintended opening of the trunk cover during travel is avoided. The evaluation mechanism and the sensor device can remain active, in order to activate a suitable alarm signal and e.g. to inform the driver.

In preferred embodiments monitoring of the internal compartment by means of the sensor device can be suspended or the extent or degree of its activation can be reduced during vehicle travel. Thus, on the one hand, the detection of the presence of a living being, person or animal, in the trunk is suspended. Alternatively, e.g. the activation degree of the sensor device and evaluation device can be controlled, e.g. according to the extent of a danger and/or the vehicle speed, in order to avoid endangering the person or animal and to activate a suitable alarm.

An especially beneficial embodiment for reliable detection of a living being includes a sensor device that has at least one motion detector and means for recognizing a motion pattern by means of the evaluation device based on the sensor signals. Knowledge of the motion pattern can establish or determine the difference between the presence of a living being located in the interior compartment or a moving inanimate object, for example a ball. Other known sensors that can be used as the sensor means in the device according to the invention include, e.g., a video camera (with a suitable light), an infrared sensor or an ultrasonic sensor. An additional beneficial feature for reliable evaluation is the detection of a closed state of the interior compartment by means of a closed state signal transmitted to the evaluation means by a closed state detector.

The reliable detection of a dangerous condition is further assisted when the closing events or processes are registered and the time intervals between the closing events or processes and/or the time since the last closing process are or is established by means of the evaluation means. With the help of the registered closing processes, the evaluation means, for example, can establish whether or not a playing child operated the trunk lid and the trunk automatically locked, if no living being is found in the trunk. A video device can be used, e.g., inside or outside of the trunk to monitor the closing processes of the trunk. When the time duration since the last closing process is known, the existing dangers to a locked-in living being can be related to the time and other parameters (temperature oxygen, exhaust gas), as needed. Additional sensors can also be used to provide significant data to the evaluation means. These other sensors can include at least one temperature sensor, an oxygen sensor and/or an exhaust gas sensor or any suitable combination thereof.

In other embodiments the ABS sensors and/or the ESP sensors already present in the vehicle can be used to establish the motion state of the vehicle, so that additional sensors for this purpose are not needed and are not included in the emergency operating device.

In order to make persons outside of the vehicle aware of a living being locked in the interior compartment or trunk of the vehicle, in preferred embodiments of the emergency operating device an alarm device is provided, which is responsive to the evaluation device. This alarm device can include at least one already present warning blinker unit, a horn, an instrument panel indicator, a vehicle positioning or locating device and/or an auto telephone.

When the evaluation means can be provided in an already present vehicle computer, the emergency operating device can be embodied by comparatively simple features or elements. For example, the functions as well as the sensors already present in the vehicle (e.g. the ABS and/or the EPS unit and/or the trunk switch) and operating elements (e.g. electronic trunk lock) can be used by suitable additional programming of the vehicle computer.

If the sensor device has a video receiver in the trunk or in the interior compartment and/or outside of it, the trunk or the interior compartment of the vehicle can be automatically locked when it is established that a playing child is outside of the trunk or interior compartment.

BRIEF DESCRIPTION OF THE DRAWING

The objects, features and advantages of the invention will now be illustrated in more detail with the aid of the following description of the preferred embodiments, with reference to the accompanying sole FIGURE. This FIGURE is a block diagram of a preferred embodiment of the emergency operating system according to the invention for the trunk of a motor vehicle.

DESCRIPTION OF THE PREFERRED EMBODIMENTS

The sole FIGURE shows block diagram of a preferred embodiment of the emergency operating device for releasing the trunk locking device of a trunk of a motor vehicle.

A trunk lock mechanism 1 is automatically operated by an evaluation device 2 in response to a sensor signal, when it is established that an endangered living being is located in the trunk. This trunk lock mechanism is provided in the form of a trunk lock. For example, a motion detector 3, a video unit in connection with an adequate light, an infrared sensor or an ultrasonic sensor or the like can be used as the required sensor for detection of the presence of an animal or human. The evaluation device 2 can derive a motion pattern from sensor signals with the help of a memory 2.1 in order to be able to determine whether the motion originates from a living being or from an inanimate object, such as a ball, moving during the travel of the vehicle. Comparison of the motion pattern derived by the evaluation device 2 with a reference pattern stored in the memory 2.1 establishes whether or not the detected motion originated from a living being or an inanimate object. Vehicle motion signals, which are obtained from a vehicle travel or motion sensor 5, can be incorporated in the evaluation. Sensors of an ABS (anti-locking system) and/or ESP (electronic Stability Program) can be used to ascertain whether the vehicle is moving or stationary. At the same time the vehicle travel or motion signals can be used for control of an activation degree of the emergency operating device and/or the detection device provided in it, in order to control e.g. the time interval between detection of sensor signals and/or production of alarm signals by means of an alarm device 10. During vehicle travel the trunk lock mechanism 2 is preferably not opened to avoid danger. However alarm signals for release of a suitable alarm, e.g., by means of a warning blinker unit 6 connected to the evaluation means 2, an acoustic warning unit 7, a positioning device 8 or an auto telephone, which calls rescue personnel. Furthermore a trunk lock state detector 4 is connected with the evaluation means 2, can be generated. The opening and closing or locking of the trunk lid is detected by means of the trunk lock state detector and registered in the evaluation means 2 by means of the memory 2.1. This latter information can be incorporated in the evaluation, in order to establish, e.g., frequent closing events or the time since the last closing event. The lock mechanism 1 or the alarm device 10 is then activated according to the evaluation including this information. The evaluation device 2 can be integrated in a central vehicle computer present in the vehicle and can be at least mostly embodied by means of suitable additional software.

In operation the emergency operating device detects whether a living being is present in the interior compartment of the vehicle, especially in a trunk of the motor vehicle, and performs an emergency operation according to the following steps: First, the device tests whether the vehicle is stationary or moving. This happens, e.g., by means of an ABS rotation speed sensor of the travel sensor device 5. In the event that the vehicle is moving, the lock state of the trunk compartment lid is monitored by means of the trunk lock state detector 4 or the tailgate switch. After the trunk lid is opened and again closed, especially with the vehicle in the stationary state, the motion sensor 3 observes the interior of the trunk so that the presence of motion in the trunk can be detected. For this purpose only large motions are rated as relevant in the evaluation in order to suppress possible errors caused by vehicles moving past the vehicle or by motions of the vehicle itself. In the event that no motion is detected in the interior compartment, i.e. the trunk, the scan rate of the motion detector 3 is increased until it is certain that no living being is present in the trunk. Then the control device and/or evaluation means 2 are/is again gradually put in a low degree of activation.

In the event that some motion is detected in the trunk, the device performs the following process steps: A motion pattern is received and classified, a pattern comparison with one or more patterns stored by means of the memory 2.1 produces a start signal for a rescue procedure to be selected. If it is determined that the vehicle is stationary, a control signal for opening the lock mechanism is transmitted. At the same time a suitable alarm (e.g. by means of the warning blinker unit 6 or the operation of the horn) is activated so that nearby persons will notice. If the opening is detected by means of the tailgate switch 4, the warning blinker unit 6 and/or preferably the horn is set or regulated. The motion sensor 3 remains still active and compares a new motion pattern after activating the unlocking signal with the motion pattern prior to activating the unlocking signal. In the event that the new motion pattern is similar to the old motion pattern, after an adjusted or adjustable time interval the warning blinker unit 6 and the horn 7 are again switched on and rescue personnel are informed, as needed. In this case the controller can be designed so that the alarm unit is switched on. If an opening is not detected by means of the tailgate switch 4, the trunk lock 1 is again electronically operated, so that the case of a defective tailgate switch 4 (a comparatively inexpensive part) is also taken into consideration. At the same time additional possible motions in the trunk are characterized. In the event the motions stop or strongly change, whereby someone outside the trunk is detected, alarms or rescue measures are broken off after a predetermined time interval, whereby whether the tailgate switch 4 is possibly defective is considered. In the event that the motion persists, the blinking and sound frequencies can be increased. An emergency call can be transmitted by means of a present auto telephone to a remote rescue worker. In the event that a vehicle navigation system is present the auto can locate itself by means of the positioning device 8 of the GPS and transmit information regarding its location.

If an exterior video unit 11 is incorporated in the emergency operating device, whether the playing child is located in the vicinity of the vehicle can be established with it and the trunk or interior compartment can be automatically locked. The sensor device 3 can be used to reliably determine whether or not a living being is actually in the trunk or interior compartment.

To ascertain the existence of additional dangerous conditions additional sensors can be connected to the evaluation device 2, for example, temperature sensors which ascertain whether the temperature is dangerously low or high can be connected to it, also according to the lock time. In addition an oxygen sensor 12 (lambda probe) for measuring the oxygen supply, or an exhaust gas sensor 13 for detecting danger because of the presence of exhaust gas, can be connected with the evaluation device 2.

The disclosure in German Patent Application 101 04 053.9 of Jan. 31, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an emergency operating device for an interior compartment of a vehicle, especially for the trunk of a motor vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. An emergency operating device for a release mechanism that opens a lock mechanism of an interior compartment of a vehicle, in which a living being could be locked, said living being consisting of a human or an animal, said emergency operating device comprising sensor means arranged in the interior compartment, the sensor means including means for monitoring the interior compartment to detect the presence of the living being in the interior compartment and means for generating and transmitting sensor signals that differ according to whether or not the living being is present in the interior compartment;

evaluation means for receiving and analyzing the sensor signals from the sensor means, the evaluation means including means for ascertaining whether or not the living being is present in the interior compartment from the sensor signals and for generating an operating signal for automatic activation of the release mechanism if the living being is present in the interior compartment;

a vehicle travel sensor comprising means for ascertaining whether or not the vehicle is stationary or moving, means for generating vehicle travel signals accordingly and means for transmitting said vehicle travel signals to said evaluation means for evaluation in said evaluation means, wherein said vehicle travel sensor is an anti-locking brake system sensor or an electronic stability program sensor; and means for deactivating, or reducing an activation degree of said monitoring of the interior compartment for the presence of the living being during travel of the vehicle in accordance with said vehicle travel signals from said vehicle travel sensor and wherein the activation degree is varied according to a vehicle speed measured by said vehicle travel sensor.

2. The emergency operating device as defined in claim 1, further comprising means for deactivating, or reducing an activation degree of, said monitoring of the interior compartment for the presence of the living being during travel of the vehicle in accordance with said vehicle travel signals from said vehicle travel sensor.

3. The emergency operating device as defined in claim 1, wherein the sensor means comprises at least one motion detector.

4. The emergency operating device as defined in claim 1, wherein the sensor means comprises at least one motion detector and the at least one motion detector produces said sensor signals and the evaluation device includes means for ascertaining a motion pattern from said sensor signals and means for ascertaining whether or not the living being is present in the interior compartment from said motion pattern.

5. The emergency operating device as defined in claim 1, further comprising a lock state detector for generating lock state signals characterizing a lock state of the lock mechanism for the interior compartment and for transmitting the lock state signals to the evaluation means.

6. The emergency operating device as defined in claim 1, further comprising a lock state detector for generating lock state signals characterizing a lock state of the lock mechanism for the interior compartment and for transmitting the lock state signals to the evaluation means and wherein the evaluation means registers locking events and time intervals between locking events or a time interval to a previous locking event.

7. The emergency operating device as defined in claim 1, further comprising a lock state detector for generating lock state signals characterizing a lock state of the lock mechanism for the interior compartment and for transmitting the lock state signals to the evaluation means and wherein the evaluation means ascertains a time interval that the interior compartment is locked.

8. The emergency operating device as defined in claim 1, further comprising a lock state detector for generating lock state signals characterizing a lock state of the lock mechanism for the interior compartment and for transmitting the lock state signals to the evaluation means and wherein the evaluation means receives and evaluates sensor signals of at least one sensing device.

9. The emergency operating device as defined in claim 1, further comprising a lock state detector for generating lock state signals characterizing a lock state of the lock mechanism for the interior compartment and for transmitting the lock state signals to the evaluation means and wherein the evaluation means receives and evaluates sensor signals of at least one sensing device and said at least one sensing device includes at least one member selected from the group consisting of temperature sensors, oxygen sensors and exhaust gas sensors.

10. The emergency operating device as defined in claim 1, further comprising an alarm device responsive to said evaluation means.

11. The emergency operating device as defined in claim 1, further comprising an alarm device responsive to said evaluation means and wherein said alarm device includes at least one of a warning blinker unit, a horn, an instrument panel indicator, a vehicle positioning device and a vehicle telephone.

12. The emergency operating device as defined in claim 1, wherein said evaluation means is provided in a pre-existing vehicle central computer or in a decentralized computer installed in said vehicle.

13. The emergency operating device as defined in claim 1, wherein said sensor means comprises a video camera device arranged in an interior chamber or outside of the interior chamber.

14. The emergency operating device as defined in claim 1, wherein said evaluation means includes means for automatically locking said interior compartment when said interior compartment does not contain said human or said animal.

15. The emergency operating device as defined in claim 1, wherein said vehicle is a motor vehicle and said interior compartment is a trunk of said motor vehicle.

16. An emergency operating device for a release mechanism that opens a lock mechanism of an interior compartment of a vehicle, in which a living being could be locked, said living being consisting of a human or an animal, said emergency operating device comprising sensor means arranged in the interior compartment, the sensor means including means for monitoring the interior compartment to detect the presence of the living being in the interior compartment and means for generating and transmitting sensor signals that differ according to whether or not the living being is present in the interior compartment;

evaluation means for receiving and analyzing the sensor signals from the sensor means, the evaluation means including means for ascertaining whether or not the living being is present in the interior compartment from the sensor signals and for generating an operating signal for automatic activation of the release mechanism if the living being is present in the interior compartment;

a vehicle travel sensor, and wherein said vehicle travel sensor includes means for ascertaining whether or not the vehicle is stationary or moving, means for generating vehicle travel signals accordingly and means for transmitting said vehicle travel signals to said evaluation means for evaluation by said evaluation means; and means for deactivating, or reducing en activation degree of, said monitoring of the interior compartment for the presence of the living being during travel of the vehicle in accordance with said vehicle travel signals from said vehicle travel sensor and wherein the activation degree is varied according to a vehicle speed measured by said vehicle travel sensor.

* * * * *